M. P. ALLEN.
DUSTER.
APPLICATION FILED APR. 16, 1914.
1,138,922. Patented May 11, 1915.
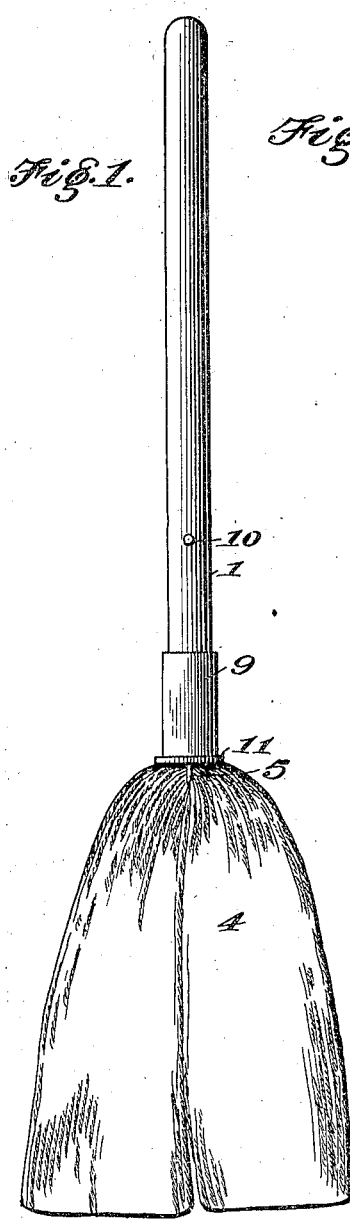
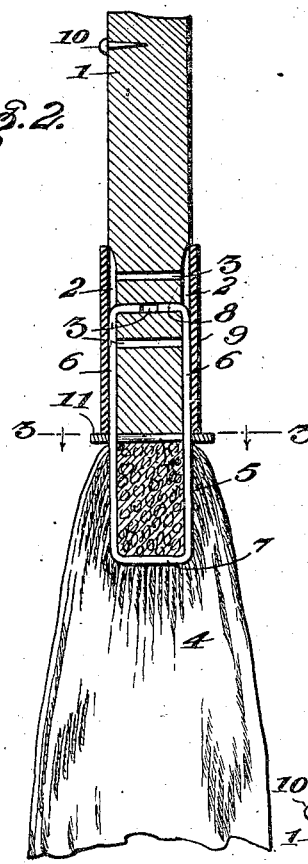
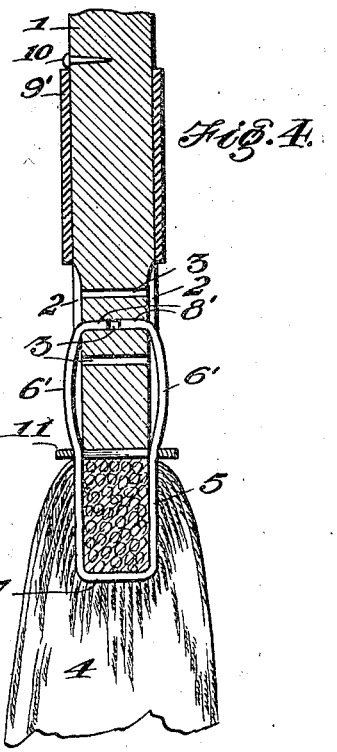
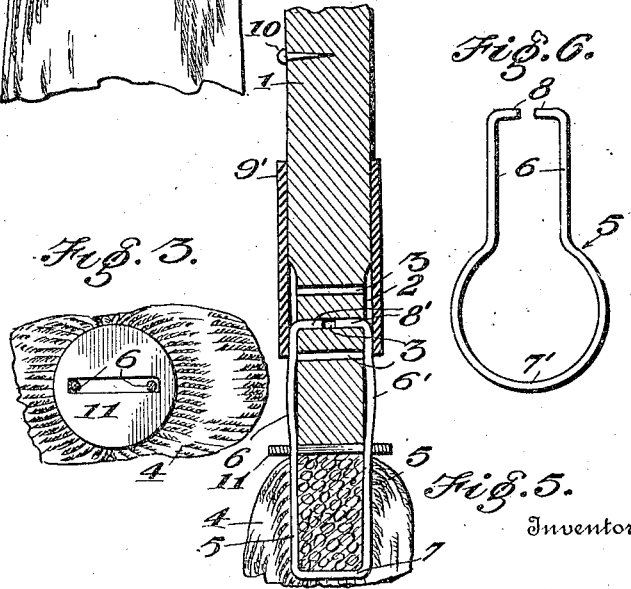
Witnesses
H. Woodard
Inventor
Melvin P. Allen
By H. B. Willson & Co
Attorneys

UNITED STATES PATENT OFFICE.

MELVIN P. ALLEN, OF KANSAS CITY, MISSOURI.

DUSTER.

1,138,922. Specification of Letters Patent. Patented May 11, 1915.

Application filed April 16, 1914. Serial No. 832,243.

*To all whom it may concern:*

Be it known that I, MELVIN P. ALLEN, a citizen of the United States, residing at Kansas City, in the county of Jackson and State of Missouri, have invented certain new and useful Improvements in Dusters; and I do declare the following to be a full, clear, and exact description of the invention, such as will enable others skilled in the art to which it appertains to make and use the same.

My invention relates to improvements in dusting devices and has for its primary object to provide a device of the hereinafter described character which may be easily and inexpensively manufactured and which will be highly efficient in operation.

In carrying out the above end, I provide an elongated handle, a dusting or cleaning element, a U-shaped attaching member for securing the cleaning element to the handle, and a sleeve slidable on the handle and adapted to retain said U-shaped member in position as will be hereinafter set forth.

A secondary object of the invention is to form the arms of the U-shaped member in such a manner as to prevent dislocation of the sleeve.

A still further object is to construct all of the parts in the most simple manner consistent with the proper operation of the device.

With the above objects in view, the invention resides in certain novel features of construction and combination of parts, herein described and claimed and shown in the drawings wherein:—

Figure 1 is a side elevation of a duster constructed in accordance with my invention; Fig. 2 is a vertical section through the head thereof; Fig. 3 is a horizontal section taken upon the line 3—3 of Fig. 2; Fig. 4 is a vertical section similar to Fig. 2 showing the application of a slightly different form of attaching member, the sleeve being raised; Fig. 5 is a similar view with the sleeve lowered; and Fig. 6 is a side elevation showing still another form of attaching member.

In the accompanying drawings, I have illustrated my invention as including an elongated handle 1 having longitudinal grooves 2 opening at its inner end and transverse openings 3 which extend through the handle and communicate with the grooves 2, on the opposite sides thereof. As clearly shown in the vertical sectional views, the openings 3 are spaced longitudinally, this provision being made for a purpose to appear.

Adapted to be attached to the handle 1 is a dusting or cleaning element 4 which is here shown as formed of a plurality of strands of cord, although it may be of any desired form, such for instance as an ordinary dust cloth.

For the purpose of uniting the cleaning element 4 and the handle 1, I have provided the U-shaped attaching members indicated at 5 in the drawings, the form illustrated in Figs. 1, 2 and 3 comprising a pair of upright arms 6 which are adapted to lie within the grooves 2 and to retain the element 4 between the cross bar 7 and the inner end of the handle 1, the outer ends of said arms 6 being turned inwardly as indicated at 8, said inturned portions being adapted for insertion into certain of the openings 3. By providing a number of the longitudinally spaced openings 3, it will be seen that the device will accommodate dusting elements of various sizes.

For the purpose of locking the inturned ends 8 and the arms 6 against dislocation, I provide a sleeve 9 which is slidable upon the handle 1 and is limited in its outward movement by a stop 10. When the parts are assembled, the sleeve 9 is adapted to be forced over the arms 6 thereby retaining the same in fixed relation to the handle.

In connection with the features so far described, it becomes expedient to provide means for preventing the strands of the element 4 from entering the space between the arms 6 and the inner walls of the grooves 2, thereby obviating the possibility of cutting said strands when the sleeve 9 is moved downwardly. For this purpose I have provided the slotted washer 11, illustrated most clearly in Fig. 3, said washer being disposed between the inner end of the handle 1 and the element 4 and effectually performing its function.

In Figs. 4 and 5, I have shown the U-shaped attaching member 5 as having its arms 6' bulged or curved outwardly intermediate their ends, this construction yieldingly locking the sleeve 9' against movement when the same is in operative position.

As still another manner in which the attaching members 5 may be constructed, I have shown in Fig. 6, a loop 7' which is of substantially ring shape, employed in place of the transverse cross bar 7, shown in the first few figures of the drawings. The coaction of this type of attaching member, with the remaining features of the invention, is identical with the form illustrated in Figs. 1 to 3.

By merely curving the arms 6' (see Figs. 4 and 5) outwardly, it will be seen that they not only perform the function of retaining the inturned ends 8' in position within certain of the openings 3, but as above stated, they serve to prevent dislocation of the sleeve 9'. This becomes a salient feature of the invention in its manufacture and successful operation.

From the foregoing description, taken in connection with the accompanying drawings, it will be seen that I have produced an extremely simply constructed duster which may be inexpensively manufactured and yet will be highly efficient in operation.

I have described my invention with considerable minuteness but I do not wish to be limited to details of construction other than those amplified in the appended claim.

Having thus described my invention, what I claim as new is:—

A device of the character described comprising an elongated cylindrical handle having at its lower end longitudinal grooves arranged at diametrically opposite points thereon said handle having transverse openings whose ends terminate in said longitudinal grooves, a cleaning element held below the end of said handle, a flat circular washer disposed between the flat lower end of said handle and the cleaning element, said washer being of a greater diameter than the end of the handle to form a projecting flange, and having a centrally disposed transverse slot of sufficient length to allow its ends to aline with the longitudinal grooves on the end of the handle, a substantially U-shaped engaging member gripping said cleaning element and having its arms projecting through the ends of the slot in said washer and arranged within the longitudinal grooves of the handle, the extreme free ends of said arms being bent inwardly at right angles to project into one of the said transverse openings in the handle, that portion of the arms extending between the washer and the inwardly bent ends being bulged outwardly along their entire length between the points aforesaid, a cylindrical sleeve slidably mounted on the handle, and the downward movement of said sleeve being limited by the flange formed by the washer, substantially as described and for the purposes set forth.

In testimony whereof I have hereunto set my hand in presence of two subscribing witnesses.

MELVIN P. ALLEN.

Witnesses:
H. M. PEELLE,
JOHN MOORE.